United States Patent
Meli et al.

(10) Patent No.: US 6,657,777 B1
(45) Date of Patent: Dec. 2, 2003

(54) INTERLEAVED LUMPED RAMAN AMPLIFIER STRUCTURE BASED ON HIGHLY NONLINEAR FIBERS FOR DENSELY SPACED WDM CHANNELS

(75) Inventors: Fausto Meli, Piacenza (IT); Fabrizio Di Pasquale, Milan (IT); Giovanni Sacchi, Milan (IT)

(73) Assignee: Cisco Technology, Inc, San Jose, CA (US)

(*) Notice: Subject to any disclaimer, the term of this patent is extended or adjusted under 35 U.S.C. 154(b) by 33 days.

(21) Appl. No.: 10/006,741

(22) Filed: Dec. 5, 2001

(51) Int. Cl.[7] ............................. H04J 14/02; H01S 3/06
(52) U.S. Cl. ................ 359/334; 359/341.1; 359/341.3; 372/3
(58) Field of Search .................... 359/134, 160, 359/177, 334, 341.1, 341.3, 341.32; 372/3, 38.06

(56) References Cited

U.S. PATENT DOCUMENTS

| | | | | |
|---|---|---|---|---|
| 4,048,443 A | * | 9/1977 | Crochiere et al. | ........ 359/133 |
| 5,905,838 A | * | 5/1999 | Judy et al. | ........ 385/123 |
| 6,310,716 B1 | * | 10/2001 | Evans et al. | ........ 359/334 |
| 6,359,728 B1 | * | 3/2002 | Angellieri et al. | ........ 359/341 |

FOREIGN PATENT DOCUMENTS

EP     1158494     * 11/2001

OTHER PUBLICATIONS

Masuda et al, ECOC'99, Sep. 30, 1999, pp. 146–147.*
Therehara et al, Opt. Fiber Commun. Conf. vol. 37, pp. 251–253, Mar. 10, 2000.*

* cited by examiner

*Primary Examiner*—Nelson Moskowitz
(74) *Attorney, Agent, or Firm*—Ritter, Lang & Kaplan LLP (57) ABSTRACT

A modular interleaved Raman amplifier structure is exploited to reap the advantages provided by the high Raman gain coefficient and small effective area of highly nonlinear fibers without incurring penalties caused by nonlinear effects and double-Rayleigh backscattering noise. Very tight WDM channel spacings may be accommodated. The amplifier structure may be implemented at very low initial cost and with high reliability, scalability, and modularity.

25 Claims, 7 Drawing Sheets

INTERLEAVED LUMPED RAMAN AMPLIFIER STRUCTURE BASED ON HIGHLY NONLINEAR FIBERS FOR DENSELY SPACED WDM CHANNELS

STATEMENT OF RELATED APPLICATIONS

The present invention relates to the subject matter of U.S. patent application Ser. No. 10/010,015 entitled "MODULAR OPTICAL AMPLIFIER STRUCTURE FOR HIGHLY DENSE INTERLEAVED WDM SYSTEMS," co-filed with the present application and incorporated herein by reference in its entirety for all purposes.

BACKGROUND OF THE INVENTION

The present invention relates to optical communication systems and more particularly to amplification in optical communication systems.

The enormous growth in telecommunication traffic is driving the development of technology to greatly expand the available bandwidth of backbone networks. In particular, there is a great impetus towards increasing the capacity of optical communication links and reducing the costs of implementing capacity-increasing technologies.

One fruitful avenue for increasing the capacity of optical communication links has been combining optical signals with multiple wavelengths onto the same fiber, a practice referred to as wavelength division multiplexing (WDM). Key to the development of WDM systems is the development of optical amplifier technology capable of boosting optical signals in a way that is transparent to data rate and format and that can provide effective amplification across a very large bandwidth.

Continuing development of WDM systems, including the advent of so-called DWDM (dense WDM) systems, is increasing the challenges inherent in optical amplifier design. Envisioned future DWDM systems will carry hundreds of very closely spaced optical signals. Spacings of less than 25 GHz are anticipated. Amplifying such a DWDM signal is problematic for a number of reasons. For example, to overcome the nonlinearity distortion inherent in such close channel spacings, current Raman amplifier technology requires very high laser pump power to achieve acceptable gain in very short fibers or in fibers with very low nonlinear coefficients (low material nonlinear coefficient and large effective area) and consequently very low Raman gain coefficient. The additional pump power comes at a high cost.

The very high cost of optical amplifiers capable of amplifying large numbers of closely spaced optical signals creates economic difficulties for service providers planning to install high capacity optical links. When a high capacity DWDM link is deployed, only a small portion of the available bandwidth is used initially with the rest being reserved for future expansion. A large up-front investment must therefore be made even though effective commercial exploitation of the new equipment remains quite far in the future.

What is needed are systems and methods for optical amplification that provide a very high system capacity but take into account relevant economic constraints.

SUMMARY OF THE INVENTION

By virtue of one embodiment of the present invention, a modular interleaved Raman amplifier structure is exploited to reap the advantages provided by the high Raman gain coefficient and small effective area of highly nonlinear fibers without incurring penalties caused by nonlinear effects and double-Rayleigh backscattering noise. Very tight WDM channel spacings may be accommodated. The amplifier structure may be implemented at very low initial cost and with high reliability, scalability, and modularity.

A first aspect of the present invention provides apparatus for amplification of a WDM signal. The apparatus includes a plurality of Raman optical amplifiers, each amplifying one of a plurality of deinterleaved subband signals, each of the Raman optical amplifiers including nonlinear fiber that is pumped with optical pump energy. A Raman gain coefficient of the nonlinear fiber is greater than or equal to approximately $3 \times 10^{-3} W^{-1} m^{-1}$.

A second aspect of the present invention provides apparatus for amplification of a WDM signal. The apparatus includes a plurality of Raman optical amplifiers, each amplifying one of a plurality of deinterleaved subband signals, and a plurality of semiconductor lasers to provide optical pump energy to the plurality of Raman optical amplifiers.

A third aspect of the present invention provides apparatus for amplification of a WDM signal. The apparatus includes a plurality of Raman optical amplifiers, each amplifying one of a plurality of deinterleaved subband signals, each of the Raman optical amplifiers including nonlinear fiber that is pumped with optical pump energy. The nonlinear fiber has an length of less than or equal to approximately 5 km in each of the Raman optical amplifiers.

A fourth aspect of the present invention provides apparatus for amplification of a WDM signal. The apparatus includes a plurality of Raman optical amplifiers, each amplifying one of a plurality of deinterleaved subband signals, each of the Raman optical amplifiers including nonlinear fiber that is pumped with optical pump energy. At least one of the plurality of Raman optical amplifiers is divided into at least two isolated stages.

Further understanding of the nature and advantages of the inventions herein may be realized by reference to the remaining portions of the specification and the attached drawings.

DESCRIPTION OF SPECIFIC EMBODIMENTS

The present invention relates to optical amplification systems. Prior to amplification, a WDM signal is broken up into two or more subbands. The subbands do not include contiguous WDM channels but rather consist of groups of regularly spaced WDM channels where each subband will typically overlap the other subbands in wavelength coverage. Successive channels in order of wavelength will typically belong to successive subbands. For example, if there are 200 WDM channels, $\lambda_1$ through $\lambda_{200}$, then there may be, e.g., 20 subbands each including 10 channels. A first subband might include $\lambda_1$, $\lambda_{21}$, $\lambda_{41}$, . . . $\lambda_{181}$. The second subband can include $\lambda_2$, $\lambda_{22}$, $\lambda_{42}$, $\lambda_{62}$, . . . $\lambda_{182}$ and so on. Each channel is typically assigned to a single subband. The spacing of channels within a subband thus will be some multiple of the spacing of the overall grid. Such subbands are referred to herein as deinterleaved subbands.

The subbands are amplified individually. High concentration Germanium fiber doping and small fiber effective area allow efficient discrete Raman amplification. The required pump power is relatively low so that semiconductor laser diodes (e.g., Fabry-Perot) may be used as optical pump energy sources, reducing cost and increasing reliability. Because of the greater spacing between channels within each subband amplifier, the high nonlinearity of the fiber does not impact performance as much as it would otherwise. The double Rayleigh scattering noise can be kept low by using short high nonlinear fiber lengths or splitting each amplifier into two or more isolated stages. Also, the structure provides the option of modular deployment of system capacity with amplification hardware being deployed only for subbands that are being used to address current capacity needs.

An optical amplification system according to the present invention may be installed, e.g., at the transmit end of a WDM link, at the receive end and between spans along the link. At the transmit end, each deinterleaved subband can be generated by multiplexing together the outputs of the appropriate single wavelength WDM transmitters. After independent amplification, the deinterleaved subbands are combined by an interleaver to form an amplified WDM signal. If the optical amplification system is installed between spans, a deinterleaver is used to recover the deinterleaved subbands from the WDM signal and an interleaver is used to combine the amplifier outputs. At the receive end, a deinterleaver is used to recover the deinterleaved subbands and the amplified subbands signals are demultiplexed into individual wavelengths for further receiver processing.

Figure 1:
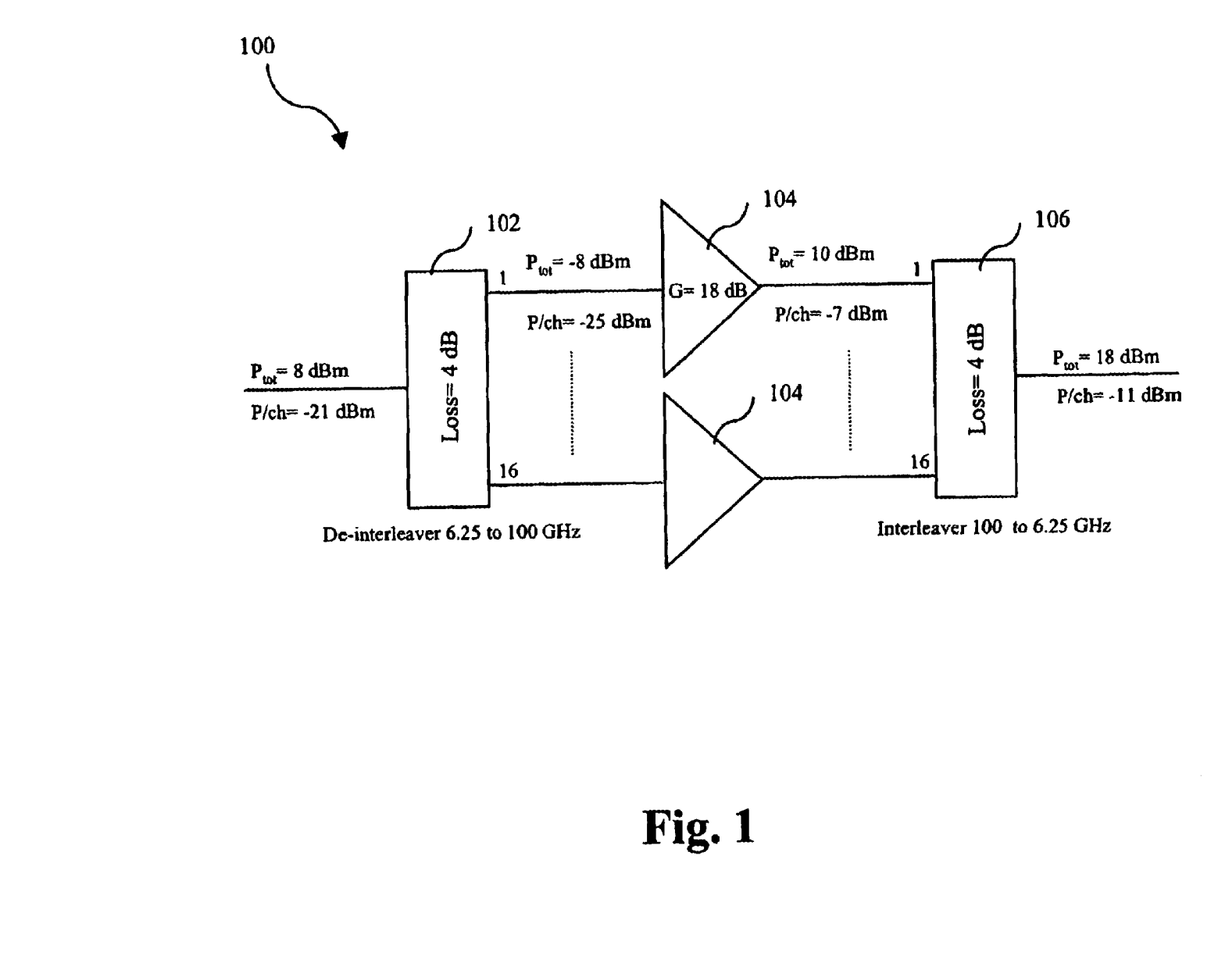
FIG. 1 depicts a deinterleaved subband amplification system according to one embodiment of the present invention.

An optical amplification system 100, according to one embodiment of the present invention, is depicted in FIG. 1. In a representative application of optical amplification system 100, a WDM link carries 800 2.5 Gbps channels spaced 6.25 GHz apart for a total bandwidth of approximately 40 nm. A composite WDM signal having these characteristics encounters a deinterleaver 102. Due to the position of optical amplification system 100 along the link and the operative link gain and loss distribution, the WDM signal encountering deinterleaver 102 has a total power of 8 dBm and a power per channel of −21 dBm. In this example the span loss is 10 dB and there is no distributed Raman amplification. Alternatively, with 12 dB of on-off distributed Raman gain the span loss could be 22 dB. Deinterleaver 102 introduces a loss of 4 dB in the depicted example. Deinterleaver 102 divides the composite WDM signal into 16 deinterleaved subbands. Each deinterleaved subband includes 50 channels spaced 100 GHz apart. Thus, each subband has a total power level of, approximately −8 dBm or −25 dBm per channel. For each of the 16 deinterleaved subbands, there is an optical amplifier 104 having a gain of 18 dB. Optical amplifier 104 is preferably a discrete Raman amplifier employing highly nonlinear (HN) fiber. The outputs of optical amplifiers 104 are amplified deinterleaved subband signals having a total power level of 10 dBm and a per channel power of −7 dBm. An interleaver 106 combines the various deinterleaved subband signals output by amplifiers 104 to form an amplified WDM signal. Interleaver 106 also introduces a loss of 4 dB so that the total output power is 18 dBm and the power per channel is −11 dBm. The total overall gain is 10 dB. Amplification gain flatness may be assured by use of a single gain flattening filter (not shown) after the interleaver.

Figure 6:
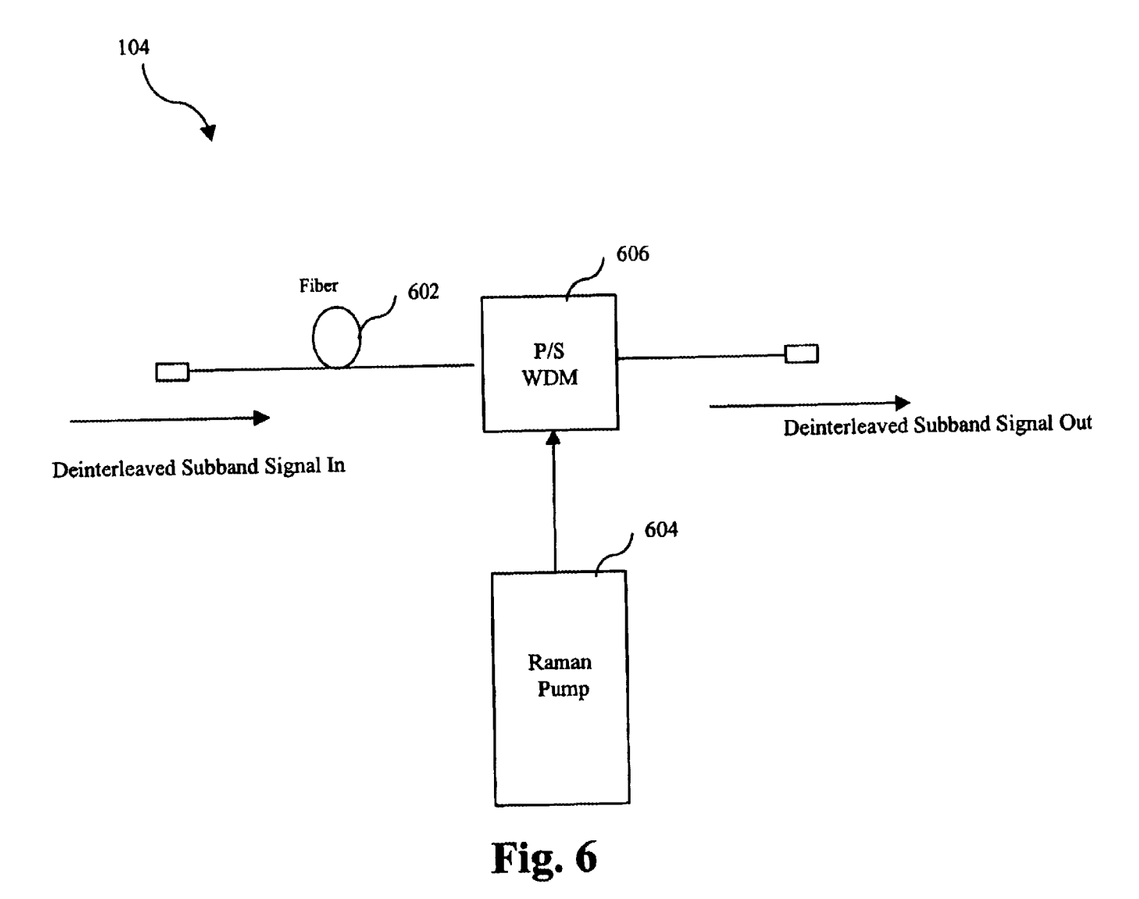
FIG. 6 depicts a single optical amplification element of the deinterleaved subband amplifier structure of FIG. 1 according to one embodiment of the present invention.

Referring now to FIG. 6, details of one embodiment of optical amplifier 104 are depicted. In the depicted embodiment, optical amplifier 104 is implemented as a single-stage discrete Raman amplifier. The deinterleaved subband signal to be amplified propagates through a fiber 602 at is pumped with optical pump energy by a Raman pump module 604. Advantageously, low pump power may be used and Raman pump module 604 may be realized by wavelength and/or polarization multiplexing semiconductor laser diodes such as a Fabry-Perot lasers.

The pump energy is injected into fiber 602 by use of a pump/signal wavelength division multiplexer 606. In the depicted embodiment, the pump energy is injected into fiber 602 in a counter-propagating direction, i.e., a direction opposite to the propagating direction of the signal to be amplified. Alternatively, the counterpropagating pump energy can also be injected into the fiber using a three port optical circulator.

Compared to a single amplifier that would be used to provide the same total overall gain, optical amplifier 104 provides 18 dB of gain to overcome the losses introduced by the deinterleaver and interleaver while the single amplifier would need to provide only 10 dB of gain. However, the noise figure of amplifier 104 is preferably very low, e.g., 4 dB whereas the single broadband amplifier would have a noise figure of approximately 8 dB due to its lower gain and higher input signal power. Amplifier 104 is preferably operated in a non-saturated mode without gain control.

The fiber used within optical amplifier 104 is preferably highly nonlinear fiber having, e.g., the following characteristics:

Raman gain coefficient $(g/A_{\textit{eff}}) > 3 \times 10^{-3}$ $W^{-1}m^{-1}$ or $> 6 \times 10^{-3}$ $W^{-1}m^{-1}$ (g is the material Raman gain coefficient)

Attenuation (1590 nm)<0.6 dB/Km

Attenuation (1480 nm)<0.8 dB/Km $A^{\textit{eff}}$ (effective area)=9 $\mu m^2$

Dispersion (1590 nm) within the range +20 to −100 ps/Km/nm

Now consider a representative implementation where the fiber in the Raman amplifiers has the following characteristics:

| | |
|---|---|
| Material Raman Gain Coefficient (g) | $5.5 \times 10^{-14}$ m/W |
| Nonlinear Coefficient | $4.4 \times 10^{-20}$ $m^2$/W |
| Loss at 1590 nm | 0.54 dB/Km |
| Loss at 1480 nm | 0.63 dB/Km |
| DRS coefficient | $2.8 \times 10^{-7}$ $m^{-1}$ |
| Dispersion at 1590 nm | −30 ps/nm/km |
| Fiber Length | 5 Km |

In one embodiment, the Raman pump modules in the amplifiers include a single laser having a power output of less than about 250 mW, e.g., 200 mW. A system bandwidth of, e.g., 20 nm may be accommodated in this way. For example, a pump wavelength of 1480 nm may be used in conjunction with a WDM signal extending from 1580–1600 nm. In an alternative embodiment, each Raman pump module includes 2 lasers that may be polarization multiplexed. A system bandwidth of e.g., 40 nm may be accommodated. For example, pump wavelengths of 1465 nm and 1500 nm may be used with a total pumping power of 350 mW in conjunction with a WDM signal occupying the range 1570–1610 nm. These pump power levels may be obtained using semiconductor lasers such as Fabry-Perot lasers.

Figure 2:
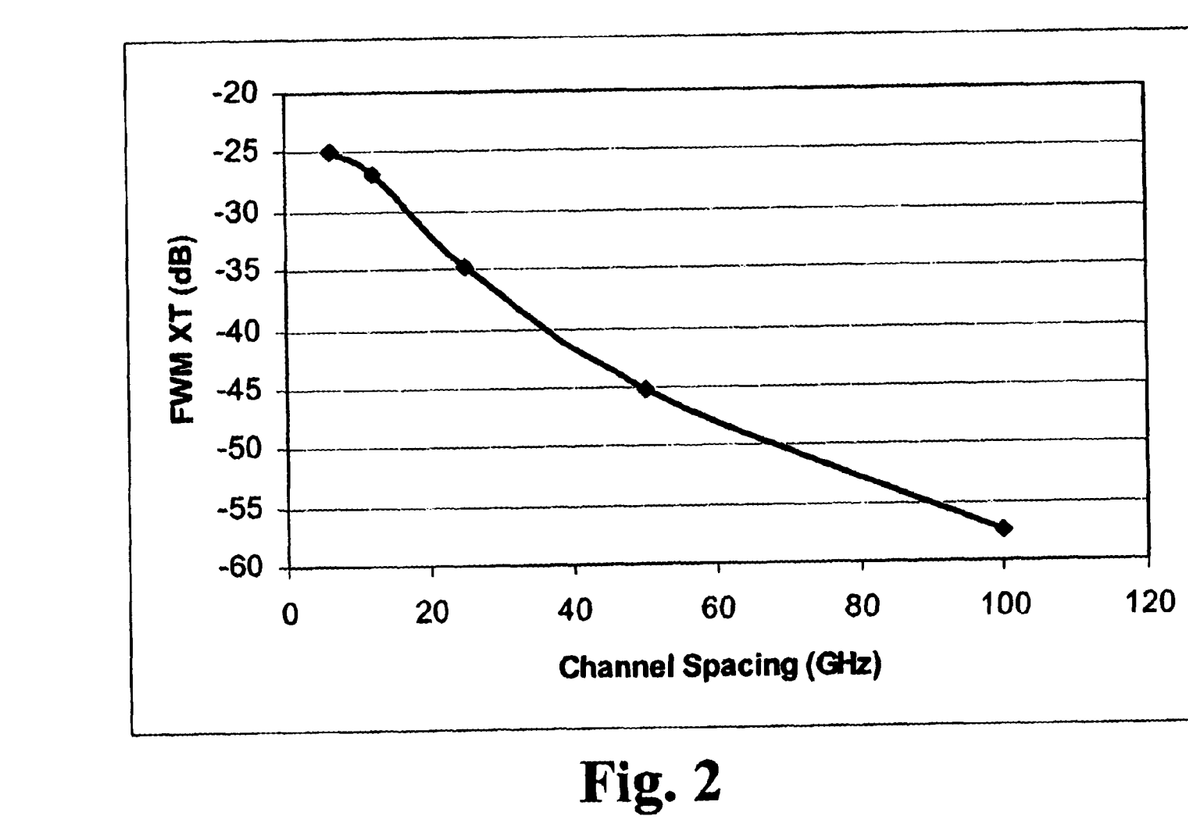
FIG. 2 depicts four-wave mixing cross-talk as a function of channel spacing according to one embodiment of the present invention.

FIG. 2 depicts four-wave mixing cross-talk as a function of channel spacing. The cross-talk value at 6.25 GHz spacing assumes a single amplifier having 10 dB gain while the values for the other spacings assume 18 dB of gain as would be provided by one of the parallel amplifiers 104 of FIG. 1. The advantage of deinterleaving in providing larger spacings can be seen since the cross-talk level is greatly reduced as the co-amplified channels are further separated from one another. For example, a 50 GHz spacing provides 45 dB cross-talk suppression.

Figure 3:
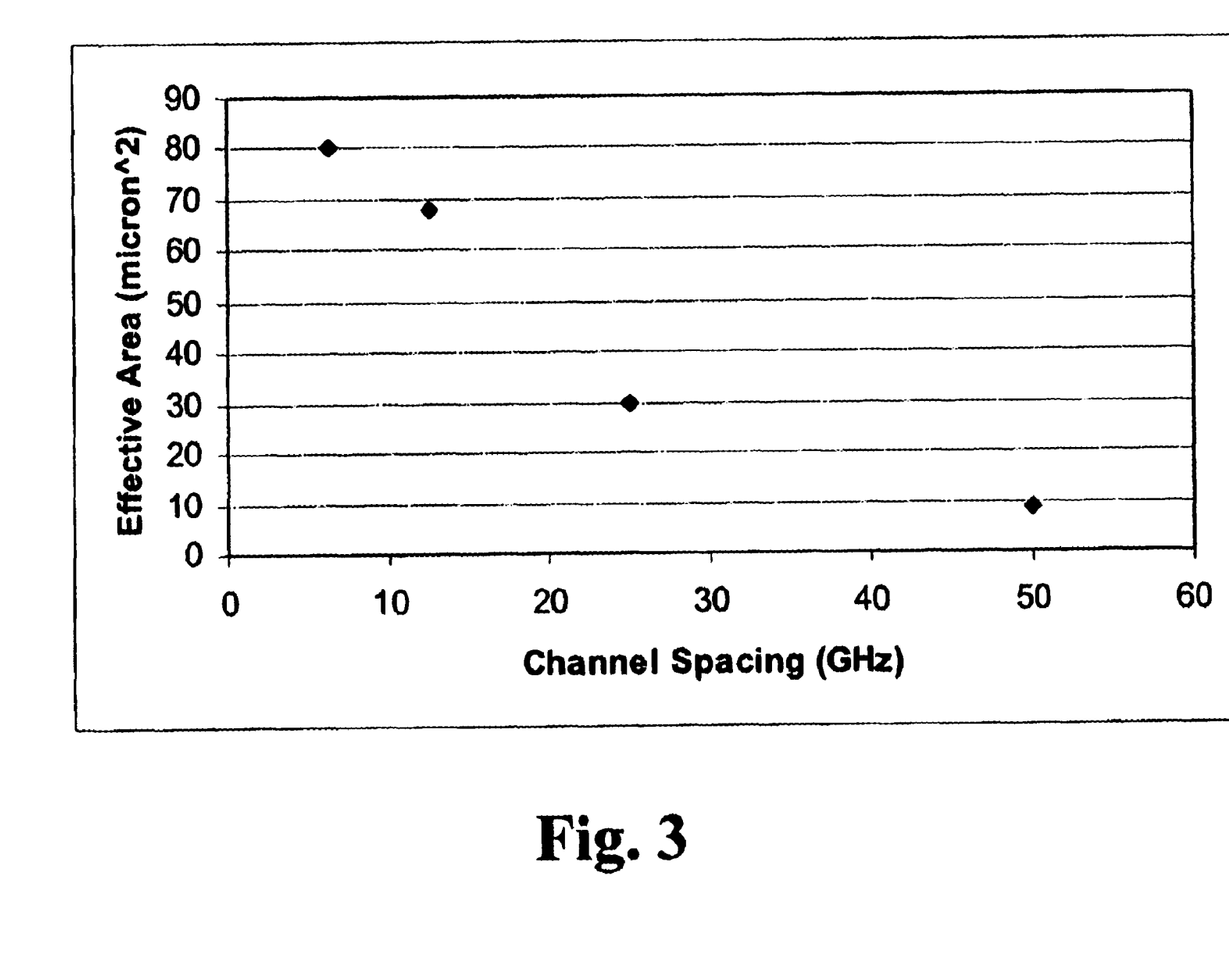
FIG. 3 depicts the necessary effective fiber area to assure four-wave mixing cross-talk suppression of greater than 45 dB for various channel spacings according to one embodiment of the present invention.

Another way to reduce four-wave mixing cross-talk is to increase the effective area of fiber 702. FIG. 3 depicts the necessary effective fiber area to assure four-wave mixing cross-talk suppression of greater than 45 dB for various channel spacings. Again, a 10 dB Raman gain is assumed for the 6.25 GHz spacing to correspond to the single amplifier case with an 18 dB Raman gain being assumed for the other spacings to allow for the insertion losses of the deinterleaver and interleaver. However, higher effective fiber areas typically require higher pump powers and the use of powerful fiber Raman lasers rather than semiconductor lasers.

Figure 4:
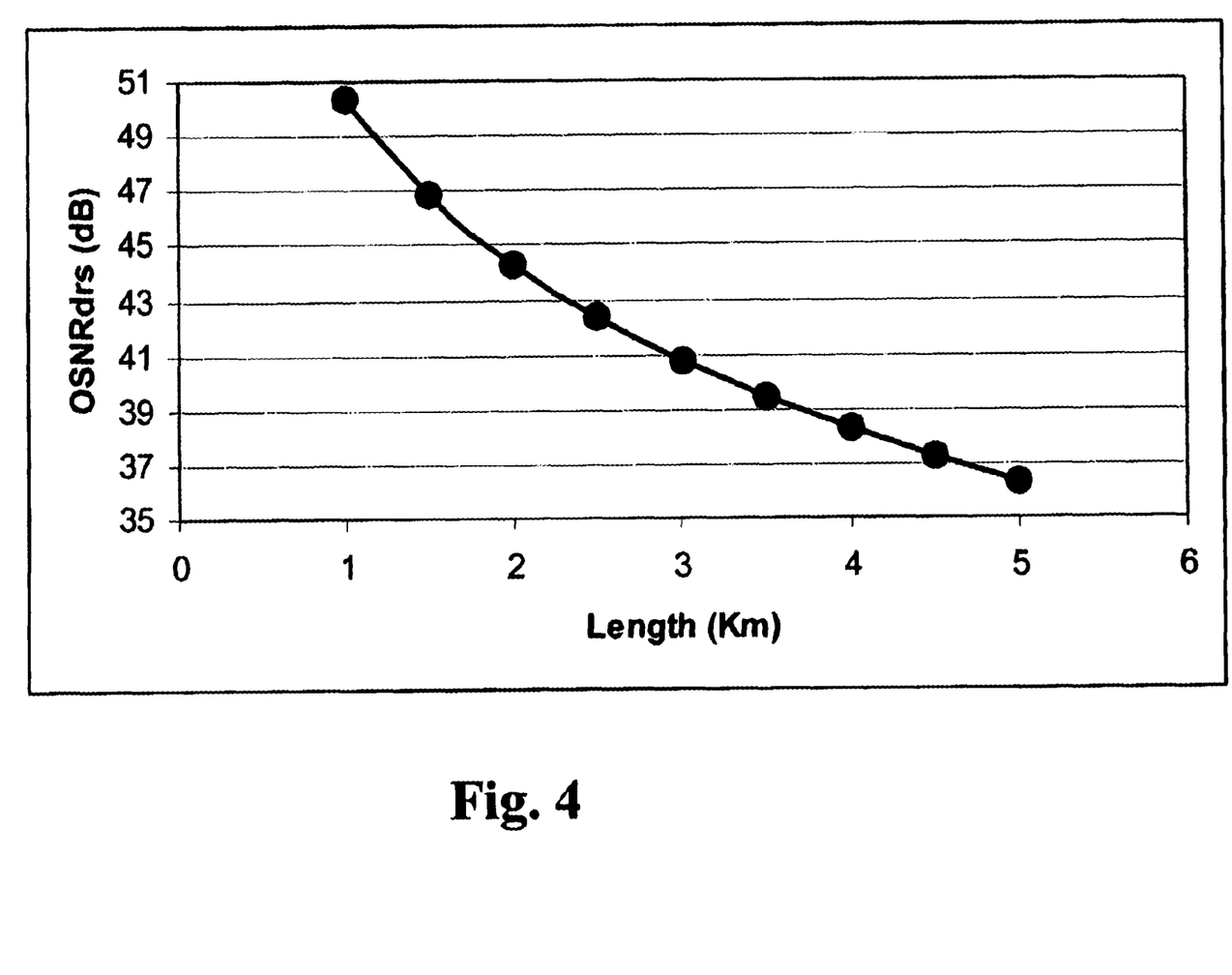
FIG. 4 depicts the variation in optical signal to noise ratio due to double Rayleigh scattering as a function of fiber length according to one embodiment of the present invention.
Figure 5:
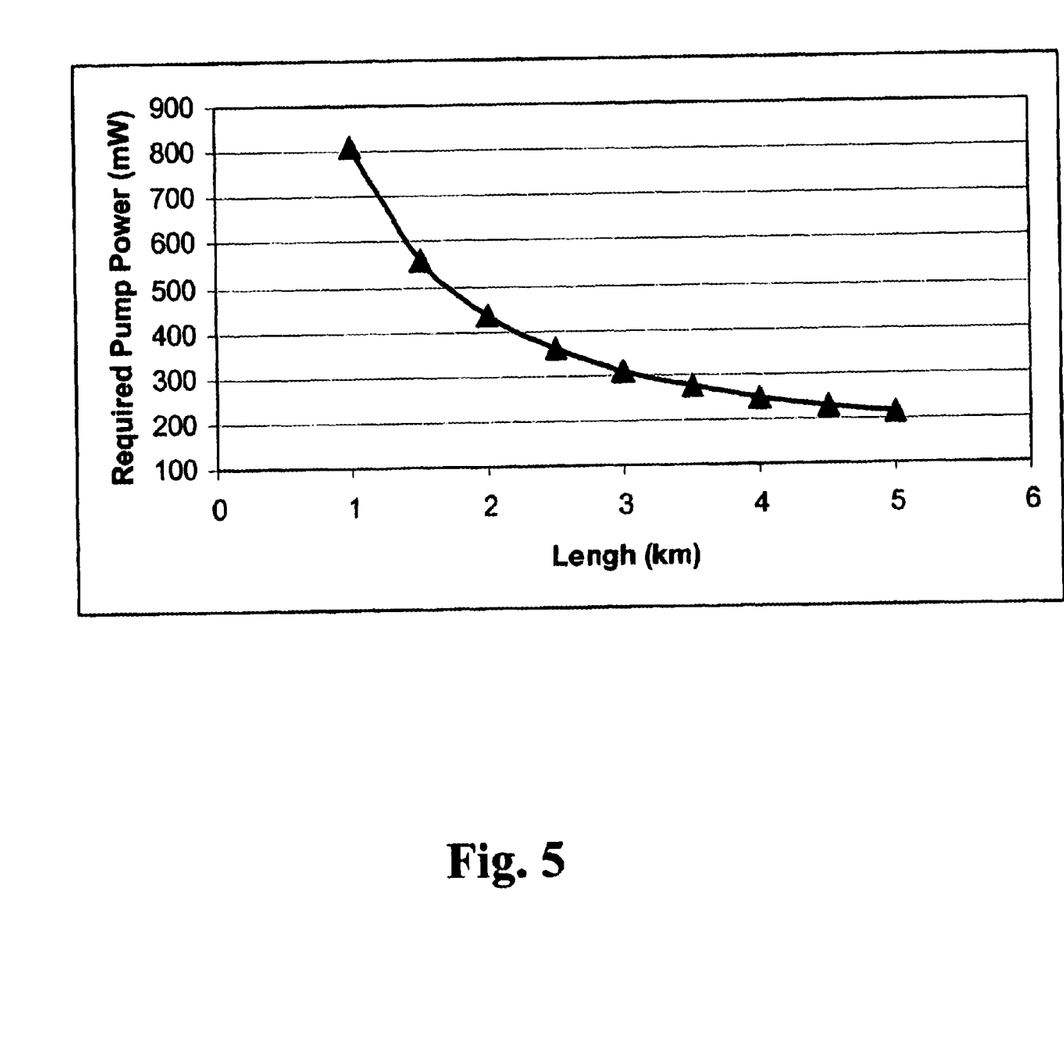
FIG. 5 depicts the variation in required pump power as a function of fiber length according to one embodiment of the present invention.

For the specific implementation employing 5 Km of fiber that has been just described, the OSNR due to double Rayleigh scattering noise is about 35 dB. This figure of merit may be improved by using shorter fiber in conjunction with increased pump power. FIG. 4 depicts the variation in OSNR due to double Rayleigh scattering as fiber length is varied. FIG. 5 depicts the variation in pump power necessary to provide 18 dB of Raman gain as the fiber length is varied. It will be seen that although pump power increases as fiber length decreases, an OSNR due to double Rayleigh scattering of greater than 43 dB can be achieved using about 400 mW of pump power. Fabry-Perot lasers may be employed to provide this pump power level. Use of these lasers is advantageous due to their low cost, high reliability, and modular packaging.

Figure 7:
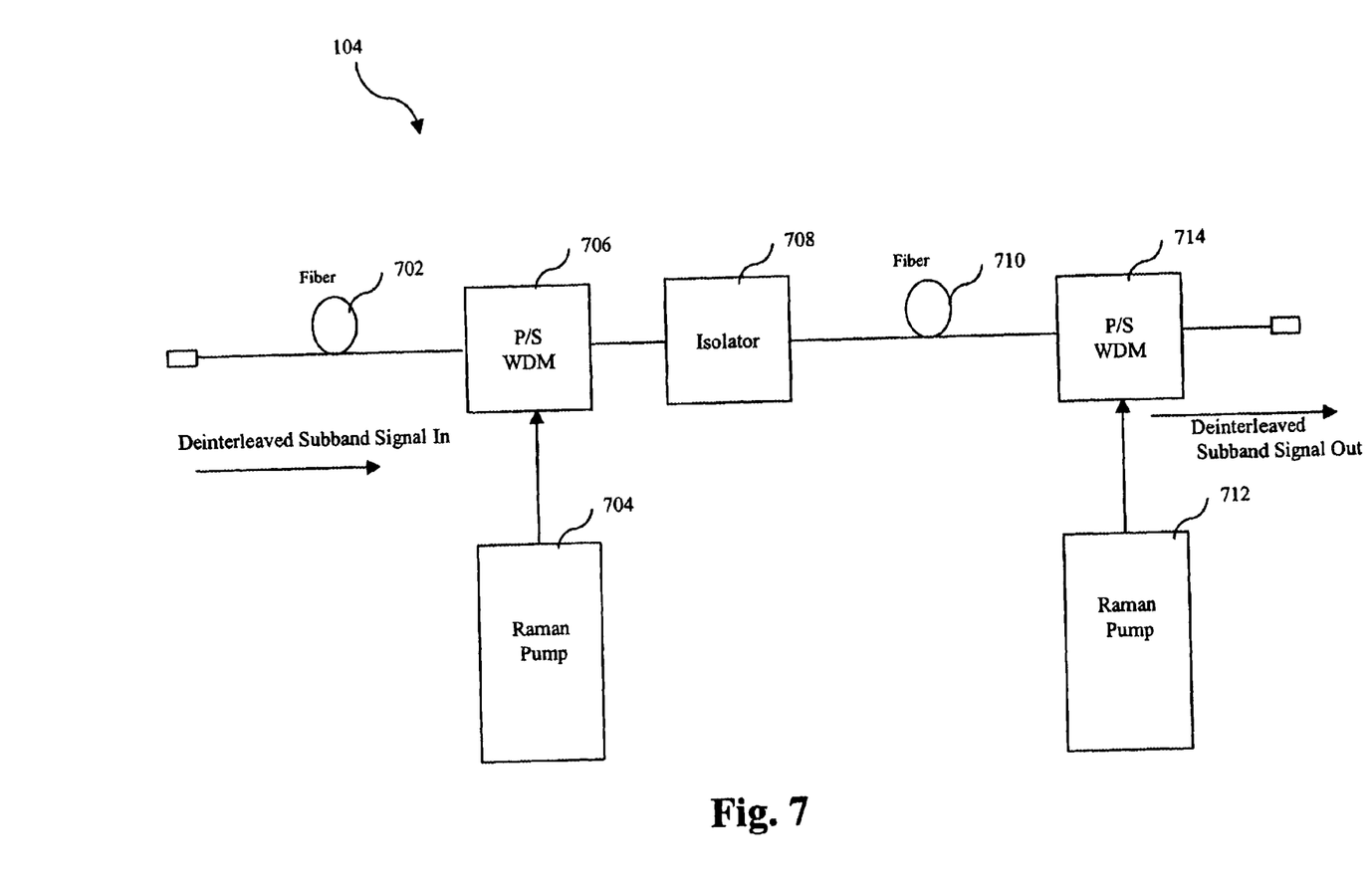
FIG. 7 depicts a single optical amplification element divided into two stages according to one embodiment of the present invention.

A further reduction in double Rayleigh scattering noise may be obtained by dividing optical amplifier 104 into two (or more) isolated Raman amplification stages. FIG. 7 depicts a representative implementation of this embodiment of optical amplifier 104. A first amplification stage incorporates a fiber 702. Optical pump energy provided by a Raman pump module 704 is coupled into fiber 702 in a counter-propagating fashion via a pump/signal multiplexer 706. An isolator 708 separates the first amplification stage from a second amplification stage. In the second amplification stage, amplification occurs within a fiber 710. Optical pump energy provided by a Raman pump module 712 is coupled into fiber 710 via a pump/signal multiplexer 714. Raman pump modules 704 and 712 may be implemented using wavelength and/or polarization multiplexed semiconductor lasers, e.g., Fabry-Perot lasers. Three-port circulators may substitute for pump/signal multiplexers 706 and 714, obviating the need for isolator 708. In one embodiment, the 18 dB gain is divided evenly between the two stages with 2.5 Km length in each of fibers 702 and 710. In one embodiment, if two pumping wavelengths are used, 300 mW of pump power is provided by each pumping unit. If one pumping wavelength is used, 170 mW of pump power is provided by each pumping unit.

Referring again to the question of selecting the effective area of fiber used for Raman amplification, an advantage of minimizing the effective area is that this facilitates the construction of fibers with very high negative dispersion, e.g., on the order of −150 ps/nm/km. Dispersion compensation may then be performed all or partially within the fiber used for amplification. Supplemental dispersion compensation may be provided, e.g., at the deinterleaver input or the interleaver output. In one embodiment, this supplemental dispersion compensation is used to trim the total amount of dispersion compensation responsive to the field-measured characteristics of each particular span.

It will be appreciated that the above-described optical amplification system provides many advantages. For example, amplification resources may be provided in a modular fashion as subbands are added to in response to traffic growth. The wide channel spacing within the deinterleaved subbands provides robustness to nonlinear effects and allows high gain to be achieved with low pumping power. The low required pumping power can be obtained from low cost, high reliability semiconductor lasers. Because the input power to the individual subband amplifiers is low and the amplifier gain is high, overall noise figure is not substantially corrupted by the insertion loss of the deinterleaver. Moreover the presence of distributed Raman amplification makes the noise figure of the discrete amplifier less significant to overall system performance. Also, dispersion compensation may be flexibly provided by the amplifiers themselves or by the amplifiers in combination with separate dispersion compensating elements.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, counter-propagating pump energy may be supplemented with or completely replaced by co-propagating pump energy which would preferably be provided by low relative intensity noise (RIN) lasers. The amplifiers would then preferably be operated in a non-saturated mode. Also, fiber lengths of greater than or less than 5 Km may be used as desired.

What is claimed is:

1. Apparatus for amplification of a WDM signal, said apparatus comprising:

a plurality of Raman optical amplifiers, each amplifying one of a plurality of deinterleaved subband signals, each of said Raman optical amplifiers comprising non-linear fiber that is pumped with optical pump energy; and wherein a Raman gain coefficient of said nonlinear fiber is greater than or equal to about $3 \times 10-3$ W−1m−1.

2. The apparatus of claim 1 wherein said Raman gain coefficient of said nonlinear fiber is greater than or equal to about $6 \times 10-3$ 1W−1m−1.

3. The apparatus of claim 1 wherein said plurality of optical amplifiers have gains greater than 13 dB.

4. The apparatus of claim 3 wherein a pump power level injected into said plurality of optical Raman amplifiers is less than about 250 mW and a length of said nonlinear fiber in each of said optical Raman amplifiers is less than about 6 km.

5. The apparatus of claim 1 wherein channel spacing within each of said deinterleaved sub-band signals is sufficient to suppress nonlinear cross-talk distortion by more than 45 dB below a desired signal.

6. The apparatus of claim 1 further comprising a plurality of semiconductor lasers to provide said optical pump energy to said plurality of Raman optical amplifiers.

7. The apparatus of claim 1 wherein said nonlinear fiber has a length of less than about 5 km.

8. The apparatus of claim 1 wherein at least one of said Raman optical amplifiers is divided into at least two isolated stages.

9. Apparatus for amplification of a WDM signal, said apparatus comprising:
  a plurality of Raman optical amplifiers, each amplifying one of a plurality of deinterleaved subband signals; and
  a plurality of semiconductor lasers to provide optical pump energy to said plurality of Raman optical amplifiers; and wherein each of said Raman optical amplifiers comprise nonlinear fiber having a Raman gain coefficient greater than or equal to about $3 \times 10-3$ W$-1$m$-1$.

10. The apparatus of claim 9 wherein a power level of said pump energy provided to said plurality of optical Raman amplifiers is less than about 250 mW per amplifier.

11. The apparatus of claim 9 wherein channel spacing within each of said deinterleaved sub-band signals is sufficient to suppress nonlinear cross-talk by more than about 45 dB below a desired signal.

12. Apparatus for amplification of a WDM signal, said apparatus comprising:
  a plurality of Raman optical amplifiers, each amplifying one of a plurality of deinterleaved subband signals, each of said Raman optical amplifiers comprising nonlinear fiber that is pumped with optical pump energy; and
  wherein said nonlinear fiber has a length of less than or equal to about 5 km in each of said Raman optical amplifiers.

13. Apparatus for amplification of a WDM signal, said apparatus comprising:
  a plurality of Raman optical amplifiers, each amplifying one of a plurality of deinterleaved subband signals, each of said Raman optical amplifiers comprising nonlinear fiber that is pumped with optical pump energy; and
  wherein at least one of said plurality of Raman optical amplifiers is divided into at least two isolated stages.

14. A method for amplification of a WDM signal, said apparatus comprising:
  deinterleaving said WDM signal to obtain a plurality of deinterleaved subband signals;
  injecting optical pump energy into each of a plurality of nonlinear fibers to induce Raman amplification of said plurality of deinterleaved subband signals; and
  interleaving outputs of said plurality of nonlinear fibers to provide an amplified WDM signal; and
  wherein a Raman gain coefficient of said nonlinear fibers is greater than or equal to about $3 \times 10-3$ W$-1$m$-1$.

15. The method of claim 14 wherein said Raman gain coefficient of said nonlinear fiber is greater than or equal to about $3 \times 10-3$ W$-1$m$-1$.

16. The method of claim 14 wherein injecting optical pump energy comprises injecting less than about 250 mW of optical pump energy into each of said plurality of nonlinear fibers.

17. The method of claim 14 wherein channel spacing within each of said deinterleaved sub-band signals is sufficient to suppress nonlinear cross-talk distortion by more than about 45 dB below a desired signal.

18. The method of claim 14 wherein said nonlinear fiber has a length of less than or equal to about 5 km.

19. A method for amplification of a WDM signal, said method comprising:
  deinterleaving said WDM signal to obtain a plurality of deinterleaved subband signals;
  operating a plurality of semiconductor lasers to inject optical pump energy into each of a plurality of nonlinear fibers to induce Raman amplification of said plurality of deinterleaved subband signals;
  interleaving outputs of said plurality of nonlinear fibers to provide an amplified WDM signal; and
  channel spacing within each of said deinterleaved subband signals is sufficient to suppress nonlinear crosstalk distortion by more than about 45 dB below a desired signal.

20. The method of claim 19 wherein said plurality of semiconductor lasers provide less than or equal to about 250 mW of pump power to each of said plurality of nonlinear fibers.

21. The method of claim 19 wherein each of said nonlinear fibers have a Raman gain coefficient greater than or equal to about $3 \times 10-3$ W$-1$m$-1$.

22. A method for amplification of a WDM signal, said method comprising:
  deinterleaving said WDM signal to obtain a plurality of deinterleaved subband signals;
  operating a plurality of semiconductor lasers to inject optical pump energy into each of a plurality of nonlinear fibers to induce Raman amplification of said plurality of deinterleaved subband signals; and
  interleaving outputs of said plurality of nonlinear fibers to provide an amplified WDM signal; and
  wherein said nonlinear fibers each have a length of less than or equal to about 5 km.

23. Apparatus for amplification of a WDM signal, said apparatus comprising:
  means for deinterleaving said WDM signal to obtain a plurality of deinterleaved subband signals;
  means for injecting optical pump energy into each of a plurality of nonlinear fibers to induce Raman amplification of said plurality of deinterleaved subband signals; and
  means for interleaving outputs of said plurality of nonlinear fibers to provide an amplified WDM signal; and
  wherein a Raman gain coefficient of said nonlinear fibers is greater than about $3 \times 10-3$ W$-1$m$-1$.

24. Apparatus for amplification of a WDM signal, said apparatus comprising:
  means for deinterleaving said WDM signal to obtain a plurality of deinterleaved subband signals;
  means for operating a plurality of semiconductor lasers to inject optical pump energy into each of a plurality of nonlinear fibers to induce Raman amplification of said plurality of deinterleaved subband signals; and
  means for interleaving outputs of said plurality of nonlinear fibers to provide an amplified WDM signal; and
  wherein channel spacing within each of said deinterleaved subband signals is sufficient to suppress nonlinear cross-talk distortion by more than 45 dB below a desired signal.

25. Apparatus for amplification of a WDM signal, said apparatus comprising:

means for deinterleaving said WDM signal to obtain a plurality of deinterleaved subband signals;

means for operating a plurality of semiconductor lasers to inject optical pump energy into each of a plurality of nonlinear fibers to induce Raman amplification of said plurality of deinterleaved subband signals; and means for interleaving outputs of said plurality of nonlinear fibers to provide an amplified WDM signal; and wherein said nonlinear fibers each have a length of less than about 5 km.

\* \* \* \* \*